United States Patent [19]

Kesling, Jr. et al.

[11] Patent Number: 4,628,068

[45] Date of Patent: Dec. 9, 1986

[54] ANTI-STATIC STYRENE POLYMER PARTICLES BY COATING

[75] Inventors: Haven S. Kesling, Jr., Drexel Hill; James J. Harris, West Chester, both of Pa.

[73] Assignee: Atlantic Richfield Company, Los Angeles, Calif.

[21] Appl. No.: 858,334

[22] Filed: May 1, 1986

Related U.S. Application Data

[62] Division of Ser. No. 812,091, Dec. 23, 1985, Pat. No. 4,603,149.

[51] Int. Cl.$^4$ ................................................ C08J 9/22
[52] U.S. Cl. ..................................... 521/57; 427/222; 427/393.5; 427/421; 521/58; 521/94; 521/95
[58] Field of Search .................. 521/57, 94, 95, 58; 427/222, 393.5, 421

[56] References Cited

U.S. PATENT DOCUMENTS 4,556,680 12/1985 Braemer .............................. 521/57

Primary Examiner—Morton Foelak
Attorney, Agent, or Firm—Lewis J. Young

[57] ABSTRACT

Expandable styrene polymer particles which have anti-static and anti-lumping properties during expansion and after molding into an article are produced by adding 0.1 to 0.4 parts of dialkyl bisalkoxylated quaternary ammonium salts per 100 parts of polymer particles by coating of the expandable polymer particles with the salts. The salts may be added as sole antistatic agent or in addition to the known internal additives which impart fastcool and antilump properties.

6 Claims, No Drawings

ANTI-STATIC STYRENE POLYMER PARTICLES BY COATING

This is a division of application Ser. No. 812,091 filed Dec. 12, 1985 now U.S. Pat. No. 4,603,149.

BACKGROUND OF THE INVENTION

This invention relates to a process for making expandable styrenic polymers anti-static and anti-lumping during pre-expansion, and after molding, by coating certain quaternary ammonium salts onto the expandable polymer particles or the molded articles.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

The formation of molded articles from expandable styrene polymer particles is effected in two steps: (1) pre-expanding of foamable styrene polymer particles to a density of between 1 and 3 pounds per cubic foot; and (2) further heating the pre-expanded particles in a closed mold to cause further expansion and form a fused, one piece article having the shape of the mold. The second step is what is normally referred to as "molding".

The pre-expansion step may be carried out by heating the expandable polymer particles by any suitable heating medium such as steam, hot air, hot water, or radiant heat. A widely used method of pre-expansion of the particles is a process such as that disclosed in U.S. Pat. No. 3,023,175 by Rodman. Another method is that disclosed in U.S. Pat. No. 3,577,360 by Immel, which teaches the pre-expansion of polymer beads by heating in a dry atmosphere followed by the application of a vacuum to cause the particles to expand to the desired density.

An undesirable result of the pre-expansion before introduction into the mold is the tendency of the pre-expanded particles to clump together and form lumps which render the particles unsuitable for molding. These lumps cannot be properly conveyed in processing plants and are unsuitable for charging into molds of intricate contour due to improper fill-out of the molded articles. Even if reasonable fill-out is achieved, variations in density within the molded articles can result and voids also occur.

Various methods have been proposed for the prevention of lumping during pre-expansion, but these have all suffered from some objectionable feature such as rapid loss of blowing agent, poor flow of the treated beads, dust problems which cause plugging of the steam ports, and often serious reduction in fusion of the particles on molding. U.S. Pat. No. 3,520,833 teaches the addition of lecithin during the impregnation of the particles with the blowing agent. Unfortunately, the lecithin imparts an undesirable odor to the molded articles. U.S. Pat. No. 3,462,293 teaches to coat the particles with polymeric materials by a fluid bed process. This process involves an additional expense of fluidizing the particles and coating with the polymer latexes. U.S. Pat. No. 3,444,104 teaches the addition of calcium silico aluminate. This additive tends to foul transfer lines and molds with clay-like deposits.

Another problem encountered with styrenic polymer particles is that of static charge on the particles, both before and after pre-expansion. The static charges cause problems in conveying the particles smoothly into, for example, the pre-expander or during the molding operation. Another area where static charges become a major problem is in the final molded product. Thus, molded styrenic polymer used to package electronic equipment can damage the enclosed equipment due to static discharge. Various antistatic agents have been used to attempt to overcome the static problems.

SUMMARY OF THE INVENTION

It has now been found that dialkyl bisalkoxylated quaternary ammonium salts, when coated onto the surface of expandable styrene polymer particles serve as an antistatic and anti-lumping agent for the particles. Coating with from 0.10 to 0.40 parts of salt per 100 parts of polymer gives a foamable product which, when pre-expanded, exhibits less lumping than expandable styrene polymers not having the quaternary salts present. Moldings made from the coated particles have better static proportion than those molded from unmodified styrene polymers.

DETAILED DESCRIPTION OF THE INVENTION

In accordance with this invention, a variety of expandable thermoplastic homopolymers and copolymers can be rendered anti-static and anti-lumping. The polymers may be derived from vinyl aromatic monomers including styrene, isopropylene, alpha-methylstyrene, nuclear methylstyrenes, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl monomer is present in at least 50% by weight of the copolymer. For the purpose of convenience, these polymers and copolymers are referred to herein as styrene polymers.

Especially useful are polystyrene, and copolymers of styrene with 5-30 weight precent of acrylonitrile, maleic anhydride, or methyl acid maleate.

The styrene polymers may be in the form of beads, granules, or other particles convenient for the expansion and molding operations. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives bead or pellet shaped product.

The styrene polymer particles may be made expandable by impregnating the styrene polymer particles with a suitable blowing agent.

To render the polymer particles expandable, the blowing agent is incorporated into the particles, as in U.S. Pat. No. 2,983,692 by suspending the particles in water in a ratio between 0.3 to 1 and 1.5 to 1 (polymer to water) with the aid of suspending agent systems such as tricalcium phosphate in combination with a surfactant to promote wetting.

During the impregnation of the particles with blowing agent, other additives can also be incorporated, such as internal fast-cool agents, pigments and dyes, stabilizers, anti-lump agents, self-extinguishing agents, plasticizers and the like.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4-6 carbon atoms in the molecule, such as butanes, pentanes, hexanes, and the halogenated hydrocarbons which boil at a temperature below the softening point of the polymer. Mixtures of these agents may also be used, such as a mixture of 40-60% n-pentane and 60-40% trichlorofluoromethane. Usually from 3-20% of blowing agent per 100 parts of polymer is incorporated by the impregnation.

The quaternary ammonium salts suitable for the present invention have the general formula

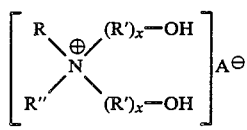

wherein R may be $C_1$-$C_{11}$ linear or branched alkyl and mixtures thereof, R' may be oxyethylene, oxypropylene, oxybutylene or mixtures thereof, R" may be $C_1$-$C_4$ linear or branched alkyl or benzyl, x may be an integer from 1 to 20, and A may be any anion.

The ammonium salts may be prepared by oxyalkylation of an amine, further catalytic oxyalkylation, followed by quaternization. The anion, A, may be especially chloride, bromide, acetate, methyl sulfate, or hydroxyl.

The ammonium salts may be coated onto the styrene polymer by any suitable method, such as dry blending in a mixer or solution coating followed by evaporation of the solvent. Certain of the quaternary salts may be added to the polymer particles during impregnation of the polymer with the blowing agents. In order for impregnation to be a useful method, however, the type of oxyalkylene unit must be selected to minimize water solubility of the salt.

The ammonium salts are added to the polymer particles in amounts between 0.1 and 0.4 parts per 100 parts of polymer. Less than 0.1 part of antistat does not give sufficient improvement in static or antilump properties and greater than 0.4 part of salt serves no useful purpose and increases the cost of the products.

The invention is further illustrated by the following example wherein parts are by weight unless otherwise indicated.

EXAMPLE I

To each of a series of wide-mouth glass jars was added 100 g. polystyrene beads with 6-7.5% by weight n-pentane blowing agent impregnated therein and having a particle size of predominantly through 16 and on 35 mesh, U.S. Standard Sieve. To each jar was then added a solution of quaternary ammonium salt in n-pentane of concentration shown in Table I as "% solution" in an amount which when the n-pentane had evaporated off left a coating of the salt shown as "% to Bead." The open jars were shaken periodically until all excess n-pentane had evaporated.

The coated beads were then pre-expanded in a Buccaneer stirred expander to a density of about 1 pound per cubic foot (pcf). A weighed portion of pre-expanded beads were then screened through a 4 mesh screen and the percent lumping determined by weighing the residue of fused pieces on the screen.

The antistatic properties of the ammonium salts was determined by molding the samples into 8 inch diameter disks of 2 inch thickness and then subjecting these to a Static Charge Analyzer, Model 276 from Princeton Electro Dynamics, Inc. The samples were charged with an ion current from a corona discharge. Sample disks were aged at the relative humidities (RH) shown and the peak sample voltage and current charge was recorded graphically for 40 seconds. Measurements given in Table I include the initial charge voltage and the % decay in volts for the first 5 seconds.

TABLE I

| | Quaternary Salt | | | | | | 1 PCF Foam Properties | |
| | | | | | | | Static Test | |
| Run No. | R[a] | x[a] | % to Bead | % Solution | % Lumping | % Fusion | Volts/% Decay/ 22% RH | Volts/Decay/ 100% RH |
| --- | --- | --- | --- | --- | --- | --- | --- | --- |
| Control | — | — | — | — | 5.4 | 81 | 1175/0.4 | 1280/3.9 |
| 1 | Bu | 10 | 0.2 | 0.46 | 1.7 | 45 | 990/92 | 1195/82 |
| 2 | Oct | 3 | 0.2 | 0.46 | 3.9 | 68 | 1350/71 | 1330/36 |
| 3 | Bu | 10 | 0.2 | 0.46 | 4.3 | 64 | 1270/29 | 1125/64 |
| 4 | Bu | 10 | 0.3 | 0.69 | 3.0 | 52 | 1165/84 | 1140/69 |
| 5 | Bu | 10 | 0.4 | 0.93 | 4.2 | 55 | 1070/82 | 1100/87 |
| 6 | Oct | 20 | 0.4 | 0.93 | 3.2 | 67 | 1150/72 | 1200/83 |

[a]Formula for quaternary ammonium salts:

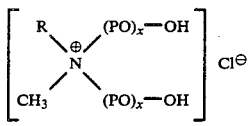

Where PO is oxypropylene, Bu is butyl, Oct is Octyl.

From the table it can be seen that the dialkyl bisalkoxylated quaternary ammonium salts of the invention have antilumping properties as well as greatly enhanced discharge, or antistatic properties.

What is claimed is:

1. A composition comprising a styrene polymer containing dispersed throughout 3 to 20 weight percent of a blowing agent and coated on the surface thereof by 0.1 to 0.4 weight percent of a quaternary ammonium salt having general formula

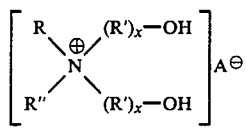

wherein R may be $C_1$–$C_{11}$ linear or branched alkyl groups and mixtures thereof, R' may be oxyethylene, oxypropylene, oxybutylene and mixtures thereof, R'' may be $C_1$–$C_4$ linear or branched alkyl or benzyl, x may be an integer from 1 to 20, and A may be any anion.

2. The composition of claim 1 wherein the styrene polymer is polystyrene.

3. The composition of claim 1 wherein the styrene polymer is a copolymer of styrene with minor amounts of acrylonitrile.

4. The composition of claim 1 wherein the styrene polymer is a copolymer of styrene with minor amounts of maleic anhydride.

5. The composition of claim 1 wherein the styrene polymer is a copolymer of styrene with minor amounts of methyl acid maleate.

6. An article molded from the composition of claim 1.

* * * * *